United States Patent [19]

Kortman

[11] 4,243,451
[45] Jan. 6, 1981

[54] BUILDING AND SHAPING A TIRE

[75] Inventor: Jan C. Kortman, Mertzig, Luxembourg

[73] Assignee: The Goodyear Tire & Rubber Company, Akron, Ohio

[21] Appl. No.: 13,593

[22] Filed: Feb. 21, 1979

[51] Int. Cl.³ .................. B29H 17/24; B29H 17/26
[52] U.S. Cl. .................................. 156/132; 156/133; 156/401; 156/416
[58] Field of Search .............. 156/131, 132, 133, 398, 156/401, 414, 415, 416, 417

[56] References Cited

U.S. PATENT DOCUMENTS

| | | | |
|---|---|---|---|
| 3,433,695 | 3/1969 | Caretta et al. | 156/415 |
| 3,767,509 | 10/1973 | Gazuit | 156/133 |
| 3,784,437 | 1/1974 | Appleby et al. | 156/132 |
| 3,830,679 | 8/1974 | Evans et al. | 156/416 |
| 3,833,445 | 9/1974 | Mallory et al. | 156/132 |
| 3,853,653 | 12/1974 | Olbert et al. | 156/128 R |
| 3,922,188 | 11/1975 | Appleby | 156/416 |
| 3,963,394 | 6/1976 | Shichman | 156/416 |
| 3,979,249 | 9/1976 | Nicholls et al. | 156/416 |
| 3,990,930 | 11/1976 | Schmit | 156/416 |

FOREIGN PATENT DOCUMENTS 2225851 12/1973 Fed. Rep. of Germany .

Primary Examiner—John E. Kittle
Attorney, Agent, or Firm—T. P. Lewandowski

[57] ABSTRACT

A flat cylindrical carcass band is built on a cylindrical surface provided by a unique shaping means and abutting turnup means. The shaping means has inner and outer walls the ends of which are juxtaposed solid elastomeric end rings so as to form an annular envelope. The outer wall has between its inner and outer layers an arrangement of spring blades of particular shape formed to control the toroidal shape of the expanded outer wall to a precisely determined contour. The turnup means each include an inner and an outer bladder the edges of each being also juxtaposed solid elastomeric end rings. The end rings of each turnup means are seated with the associated end rings of the shaping means in a common retaining groove formed in a circumferential set of radially extendable segments which expand the end rings and the overlying carcass to conform the carcass initially about preloacted bead cores. To conform the carcass about the bead cores before fully shaping the carcass toroidally, the shaping means has also a pair of inner bladders each having a solid elastomeric ring interfitting respectively with and between the end rings of the mentioned envelope. These latter inner bladders cooperate on inflation to roll the carcass band lying close to the respective beads outwardly and to compact the bead region, and thereafter the shaping means envelope is inflated to shape the carcass between the bead regions and the outer bladder of the turnup means is inflated to extend the turnup, and optionally, to apply sidewall material.

12 Claims, 3 Drawing Figures

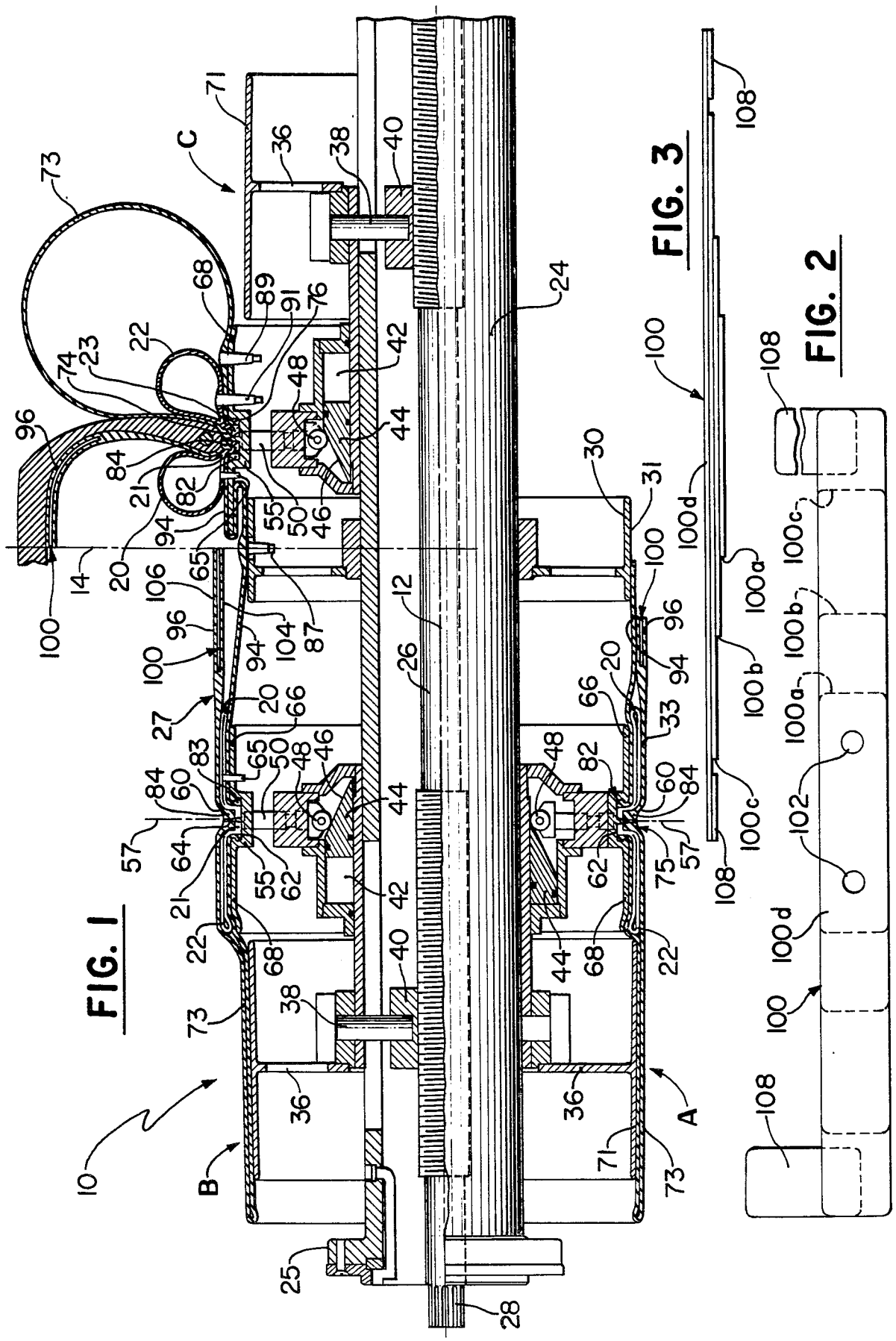

BUILDING AND SHAPING A TIRE

The foregoing abstract is not to be taken as limiting the invention of this application, and in order to understand the full nature and extent of the technical disclosure of this application, reference must be made to the accompanying drawing and the following detailed description.

The present invention relates to building tires and particularly to truck tires. Still more particularly, the invention relates to shaping to toroidal form the crown portion of a tire, to turning ply endings of the tire carcass outwardly around beads before and after the toroidal shape is achieved, and for compressing the bead regions of the toroidally shaped tire before the tire is removed from the apparatus.

The object of the invention is to provide an improved method and apparatus for building, and shaping a truck tire. Further objects and advantages will be made apparent in the description of a preferred embodiment.

In one broad aspect, the objects of the invention are achieved by a tire building apparatus comprising carcass shaping means having means for modifying the inflated shape of said shaping means, with respect to its toric shape, to a toroid having an aspect ratio at least approximately equal to the predetermined aspect ratio of the tire when it has been molded and cured, said shaping means having a radially outer wall comprising an outer layer and an inner layer coaxially and integrally joined to the outer layer, each said layer having reinforcing cords which extend from axial end to axial end of the respective layer, said means for modifying the shape comprising a plurality of elastically flexible blades equally spaced circumferentially of and extending longitudinally between said outer layer and said inner layer, each said blade occupying a congruent cavity formed between said inner and outer layer, each blade being rectangular in cross-section and graduated in thickness from its center axially outward to a lesser thickness at the respective ends thereof, each blade having an extension laterally outwardly from each of its respective ends, said extension lapping the associated end of the next adjacent blade, and a pair of holes or an equivalent pattern of apertures extending radially of the drum axis through each blade, said inner and outer layer being integrally connected to each other through said holes to maintain the respective blades parallel to the axis of the shaping means.

In a further broad aspect, the objects of the invention are obtained by a method of building and shaping a tire comprising providing flat cylindrical surface means including a center envelope terminating in spaced planes normal to an axis and turnup bladders respectively abutting and extending oppositely outward coaxially from said envelope; forming a precarcass band in flat cylindrical form on said surface means; positioning a pair of preformed inextensible bead cores in radially and coaxially spaced relation about said band; expanding said band first at circumferential locations respectively coplanar with the bead cores to initiate conformation of the band about said bead cores; expanding portions of said band then at locations immediately adjacent to and respectively inward and outward of each bead to roll said portions progressively radially outward of each bead core to enclose each bead core respectively between said portions while moving said beads axially toward each other sufficiently only to accommodate such expansions; thereafter shaping said band between said beads to a predetermined toroidal form by applying radially outward pressure and concurrently moving said beads toward each other to the spacing therebetween desired in the tire after curing the same; and subsequently completing and curing the tire.

In another aspect, the objects of the invention are attained by a tire building drum comprising shaping means having a pair of coaxially spaced first solid elastomeric end ring assemblies, an outer wall member and an inner wall member each said member having at each of its axial ends a solid elastomeric ring juxtaposed to the respectively associated end ring of the other member, the wall members defining therebetween a first annular inflatable envelope, which when uninflated forms a flat cylindrical building surface; two turnup means each having a second solid elastomeric end ring assembly, an outer annular bladder having a pair of solid elastomeric end rings and a first inner annular bladder having a solid elastomeric ring interfitted between the end rings of the outer bladder to form said end ring assembly; clamp means including a plurality of radially movable segments arranged in two coaxially spaced apart circumferential rows, a circumferential seat formed in each row of said segments, each seat retaining in juxtaposed relation one of said first end ring assemblies of said shaping means and the respectively associated second end ring assembly of said turnup means; bead forming means comprising a pair of second annular bladders disposed between said inner and said outer wall members, each of said second bladders having a single solid elastomeric ring disposed between the respectively associated pair of end rings of the wall members and extending when uninflated axially toward the other thereof a distance less than one-half the distance between said ring assemblies, each said second bladder extending when uninflated axially inward from its associated ring assembly a distance at least approximately equal to the axial extent of the associated first bladder of the first-mentioned pair thereof.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

In the drawings:

FIG. 1 is a composite view of a building-shaping drum showing stages in the operation, according to the invention;

FIGS. 2 and 3 illustrate in plan and in elevation respectively a feature of the drum of FIG. 1.

Referring to the drawings, particularly to FIG. 1, there is shown schematically in composite axial cross-section a tire building drum 10. For purposes of reference in the description, the lower left quadrant A of the drum is shown in its initial building condition, the upper left quadrant B of FIG. 1 illustrates the drum in an initially expanded condition, and the upper right quadrant C illustrates the drum in a third condition in which the tire to be formed is fully shaped. The respective quadrants are defined by the rotation axis 12 of the drum and the center plane 14 of the drum normal to the axis.

A particular feature of the drum is the ability to provide for tightly fixing the bead cores in the carcass and tightly wrapping the ply endings around the bead cores without causing rotation of the cores. In particular, the arrangement of the bladders 20 and the bladders 22, presently to be more fully described, provides the capability of applying to the bead regions of the tire, a uniformly circumferentially distributed fluid pressure by which the bead regions are firmly compacted. This feature is of particular advantage in the manufacture of tires in which the ply reinforcement elements are wire or metal cords or cables or in which the ends of the plies, in the finished tire, extend a relatively short radial distance outward of the beads. The drum 10 also by its particular arrangement provides the facility for conveniently applying the sidewalls of the tire to overlie the edges of the tread of the tire, as well as with equal facility, the ability to apply the edges of the tread to overlie the sidewall portions.

The drum 10, referring to FIG. 1, has a hollow tubular center shaft 24 which is provided with a flange 25 by which it can be mounted for rotation about its own longitudinal axis 12 in a tire building machine (not shown). An operating screw 26 disposed coaxially in the shaft has a splined tang 28 adapted for connection to operating means (not shown) in the building machine.

A center support ring 30 fixed on the shaft has a cylindrical outer surface 31 of fixed diameter which, in the first diameter condition of the drum, supports the inflatable annular shaping envelope 27 which forms, with the turnup bladders, the axially continuous cylindrical building surface 33.

A pair of opposed end housings 36 are mounted slidably on the center shaft and are connected by studs 38 extending through longitudinal slots in the shaft wall respectively to a pair of nuts 40 threaded on the righthand and lefthand portions respectively of the operating screw. The end housings are moved symmetrically toward or away from the centerplane 14 by rotation of the operating screw.

An annular cylinder 42 fixed in each of the end housings contains an annular piston 44 having a conically formed ramp 46 thereon which engages rollers 48 mounted in the inner ends of the struts 50 slidable in slideways formed in the end housings 36. The arrangement of the annular pistons is such that the respective struts are moved radially outwardly of the axis in response to the admission of compressed air in the cylinder.

A plurality of segments 55 are arranged circumferentially at each of the two axially spaced bead-locating planes 57. Each segment is fixed on a respective one of the struts 50 and is lifted radially outwardly to an increased diameter by the action of the piston 44. The arrangement provides positive solid support rigid from the segment to the shaft to maintain concentricity of the overlying grooves 60 for locating a bead.

Each segment is provided with a T-shaped or dovetail slot 62 which slots are aligned circumferentially in their respective planes so as to form a continuous circumferential groove symmetrically located in each of the bead-locating planes 57. A septum or rib 64 which is tapered radially outwardly is fixed in each said slot so as to form a circumferentially continuous rib which divides each of the grooves into two channels.

Each segment 55 extends axially from the slot so that each circumferential set of segments is provided with flanges 66, 68 which support respectively the bladders 20 and 22. The flanges 68 which extend axially outwardly from the slot 62 are, near their more distant ends, sloped radially inwardly to accommodate the deflated bladders 22. The end housing assemblies 36 also include members 71 providing a cylindrical support surface on which the turnup bladders 73, in their uninflated state, are disposed.

The building surface 33 of the drum is provided by the shaping means which includes a first inflatable annular envelope 27 which terminates in axially spaced apart solid elastomeric ring assemblies 82 which are respectively received in the axially inward channels of the slots 62, being retained therein by the undercut portion of the T-slot or dovetail groove and by the rib 64. The turnup bladders 73 each have also an annular solid elastomeric end ring assembly 75 which are disposed respectively in the axially outer channels of the slots and retained therein by the re-entrant portion of the dovetail or T-slot and by abutting the center rib 64 in the groove. The radial height of the rib is such that its radially outward edge lies inward of the outward surfaces of the end ring assemblies and such that an end ring assembly of the shaping envelope abuts directly the end ring assembly of the turnup bladder in each of the slots. The radially outward surfaces of the respective end ring assemblies 82, 75 are formed with concavities which cooperate to provide a bead-seating groove 60 which is symmetrical with the respective bead-locating plane and which can be shaped to suit the bead cross-section.

Within the envelope 27, that is, between its inner and outer walls, a pair of smaller annular inner bladders 20 extend axially inward from the respective end ring assemblies 82. Each bladder 20 has an integral solid elastomeric ring 21 of cross-sectional shape adapted to interfit between the rings 83, 84 in the associated end ring assembly 82. Controlled air pressure is admitted to each bladder 20 by way of a nipple 54 extending radially through the inner wall 94 and through a suitable opening in the associated flange 66. The bladders 20 each extend axially not more than one-third of the axial distance between the end ring assemblies 82.

The shaping envelope and the respective turnup bladders are separate and independent with respect to each other for removal and replacement and are independently inflatable. The shaping envelope is connected to means for supplying air at controlled pressure by way of one or more nipples 87 accommodated in suitable holes in the center support. Each of the turnup bladders 73 is supplied similarly with compressed air at controlled pressure by way of the nipples 89 accommodated in corresponding holes in the flanges 68.

In each of the turnup bladders there is disposed the smaller inflatable annular bladder 22 having a solid elastomeric ring 23 which is secured in the slot 62 between the respective end rings 74, 76 of the bladder 73 of the respective turnup means. Inflation air for the bladder 22 is supplied by a nipple 91 which extends inwardly through the wall of the associated turnup bladder 73 and through a further opening through the flange 68 of one of the segments.

The shaping envelope 27 has an inner wall 94 and an outer wall 96 each of which has axially extending inextensible reinforcing cords therein. The inner wall and the outer wall each terminate axially in respectively integral solid elastomeric end rings 83, 84.

It will be seen that each of the walls 94 and 96 of the shaping envelope 27 are integral sleeves and are separable from each other, as well as from the inner annular bladders 20. The respective end rings 83, 84 of each are molded to interfitting annular shapes by which the end ring assemblies 82, including the ring 21, are made and retained in the respective slots 62. The end rings 74, 76 of the bladder 73 are likewise molded to interfit with the ring 23 of the inner bladder 22 so as to form the end ring assembly 75.

Thus, the sleeves which form the walls 94, 96, the turnup bladders 73, the inner bladders 20 and 22 are each made as separate elements and connected in the apparatus by juxtaposing their respective end rings in the slots 62 of the segments so as to form the end ring assemblies described. The fabrication and the replacement of the components of the assembly are simplified. In use, the compression of the end assemblies 82 and 75 as the segments extend to clamp the bead cores ensures the airtightness of the envelope 27 and of the turnup bladders 73.

To modify the inflated shape of the outer wall 96 with respect to the unrestrained shape of such outer wall, a plurality of stiffening blade members 100 are disposed within the outer wall. The blade members are of rectangular cross-section. In the drum 10 these members are blades or strips 34 millimeters in width measured in the circumferential direction and about 2.4 millimeters in thickness measured in the radial direction at the centerplane 14. The blade members extend longitudinally, parallel to the axis 12 of the drum and are spaced equally around the axis. Each of the blade members is graduated, that is, reduced in thickness (measured radially of the drum) from a greater thickness at the centerplane to a lesser thickness at each of the respective ends of the member, the members being terminated axially inwardly of the elastomeric ring assemblies 82. Each blade member, in order to secure its orientation in the elastomeric member of the outer wall is provided with a pair of round holes 102 extending through the blade member in the radial direction and which holes accommodate elastomeric stems or rivets by which the blade is anchored both to the inner 104 and outer 106 layers of the outer wall 96. The blades, however, are not otherwise fixed to the layers, but occupy contiguous cavities formed in the wall. The circumferential elongation of the wall is thus not made irregular and the cross-sectional periphery at a typical plane is circular. Each of the blade members is provided with a lateral extension or stabilizer 108 which is attached integrally to the blade member and extends circumferentially in the outer wall so as to lap at least a portion of the next blade member. The side or lateral extensions 108 can project from the blade member either in the same direction as shown or in opposite circumferential directions from the respective ends. In the circumferential direction while the envelope is uninflated the spacing between the blade members is about 4 millimeters which gap, of course, is increased materially, for example, as much as 25 to 30 millimeters, when the outer wall is expanded into the toroidal shape during the shaping of a tire carcass thereon.

A carcass which is shaped without the use of a bladder or by using a gum or fabric-reinforced bladder tends to be expanded to an approximately circular toric cross-section shape. The blade members 100, by being graduated, that is, tapered or stepped, enable the shape of the inflatable shaping envelope 27 to be modified with respect to the shape of such an envelope without blade members to a shape which closely approximates the desired cross-sectional shape of the tire carcass (before a restrictor belt is applied) which shape approximates very closely the ultimate transverse contour of the tire after molding and curing. The shape in the present apparatus has an aspect ratio of about 0.65. By suitably proportioning the blades, the aspect ratio of the shaping envelope outer wall can be varied to suit a predetermined aspect ratio of a tire to be built in the apparatus 10. In the embodiment being described, the blades are each formed by laminating strips of a carbon spring steel in the manner illustrated in FIGS. 2 and 3. The shortest strip 100$a$ is 120 millimeters in length, the next strip 100$b$ is 200 millimeters, the third 100$c$ is 320 millimeters, and the longest strip 100$d$ is 400 millimeters. As will be apparent at this point to persons skilled in the related arts, the steps or graduations in thickness can be selected to suit the deflection contour desired for a particular tire type and size, and that suitable blades can be laminated as described or formed as single integral blades.

It has been found to be important that the inside layer 104 of the outer wall 96 should be airtight so that the inflation air within the envelope 27 will not penetrate into the cavities in which the blades 100 are contained. To this end, both layers of the outer wall are reinforced with axially extending glass-fiber cord or an equivalent reinforcement. It has been found also that the side extensions 108 inhibit or eliminate the tendency of such reinforcement cords in the outer wall, in a gap between the adjacent pairs of blades, to take their so-called natural shape. Without the use of the side extensions 108, this effect results in an undulating shape especially in the wall 96 at or near the respective ends of the blades.

Advantageously, the radially outer surface of the outer wall is formed so as to have a plurality of circumferentially spaced grooves sunk in the surface of the bladder and sufficiently long to permit air to enter or be retained between the inner surface of the tire carcass and the outer surface of the outer wall of the envelope when the envelope is deflated. These grooves extend preferably at angles of approximately 45 degrees with respect to the axial plane but can be angled to suit in a range of from 15 to about 75 degrees with respect to such axial plane. The grooves can extend from one to the other of respective end rings at the same angle or at opposite angles to form a herringbone pattern. The axially inner ends of the grooves can be terminated short of the center plane, for example, in the region of the outer wall corresponding to the shoulder of the tire to be shaped but grooves must be open outwardly continuously to the bead region in order to admit atmospheric air between the outer wall of the envelope and the inner surface of the tire carcass.

The blade members illustrated in FIGS. 2 and 3 were successful in modifying the inflated shape of the outer wall of the envelope to a contour of a 18(65)R 22.5 tire and exhibited suitable durability by being inflated and deflated more than 900 times at pressures up to 12 pounds per square inch without failure.

Note that the blade member of laminated strips has its shortest component 100$a$ disposed on the radially inward side.

The manner of using the drum is as follows. While the drum is in the axially expanded and radially uninflated state as illustrated in the lower left quadrant of FIG. 1, an impervious liner of gum rubbery material in sheet form is wrapped about the drum and a squeegee layer is wrapped thereon.

Strips providing chafer elements are then wrapped circumferentially about the drum in the appropriate axial locations. Strips forming chafer pads are wrapped circumferentially about the drum outwardly axially from the bead locating planes, that is, on the respective turnup bladders. Material forming the sidewall is wrapped about each of the respective turnup bladders as is a chipper strip. Radial cord ply is then wrapped about the drum being located symmetrically with respect to the centerplane and extending outwardly an appropriate axial distance beyond the respective bead-locating planes. The ply is then covered with a squeegee layer. A strip forming a portion of the apex is wrapped at an appropriate axial location overlying the bladders and then shoulder wedge strips are wrapped about the respective bladders in appropriate location.

Then the bead cores, together with further portions of their respective apex strips preassembled thereon, are moved coaxially over the drum to positions concentric about the drum in the bead-locating planes 57. Next, compressed air is admitted to the respective annular cylinders 42 to move the pistons outwardly of the respective cylinders and thereby effect a positive concentric radially outward movement of the segments 55, bringing the carcass band into concentric engagement with the respective bead cores and initiating the wrapping of the carcass band about the respective beads thereby positively clamping the beads into position relative to the carcass band. The drum width is then slightly decreased by moving the housing assemblies 36 a small distance toward one another while each of the small annular bladders 20,22 are inflated simultaneously to internal pressures of approximately 207 kPa. This inflation causes the carcass band to be further conformed by rolling the adjacent band regions progressively radially outward about both sides of the bead. The end housings 36 are then driven toward one another while air at a pressure of approximately 69 kPa is introduced into the shaping envelope. Movement of the end housings is continued until the beads are spaced axially apart a distance equal or very nearly equal to the distance between the beads at which molding and curing of the tire will be effected.

Notably, from the initial positions of the bladders 20,22 until the tire reaches the conformation shown in the upper right quadrant C of FIG. 1, a radially progressive, circumferentially continuous and uniform squeeze is applied to each bead region so as to effect a firm, well compacted bead for the tire, also at least initiating the turnup of the carcass band endings.

Two alternative modes are available with the drum. For tires in which it is desired that the sidewall overlie the edges of the tread applied to the carcass, the inextensible breaker belt and tread are applied to the expanded carcass after which the turnup bladders are inflated and pushed axially toward the shaped carcass by the use of pusher plates or the equivalent.

In a tire construction which disposes the edges of the tread over the edges of the sidewall, the turnup is made by inflating the turnup bladders before the application of the inextensible breaker belt and tread combination.

After the assembly of the tire on the drum is complete, the bladders 20,22 are deflated and immediately thereafter the shaping envelope 27 is deflated. Air entering the aforementioned grooves tends to facilitate the release of the outer wall from the tire liner. The segments 55 are collapsed inwardly in response to the elastic tension of the respective end rings and the exhaust of pressure air from the annular cylinders.

If the bead-to-bead distance mentioned in the final shaping is less than the axial dimension of the blade members, the end housings are moved axially away from each other a distance sufficient to allow the envelope 27 to collapse before the segments are retracted. With the drum returned to the first position, illustrated in the lower left quadrant A of FIG. 1, the tire can be removed for further processing including the molding and curing thereof.

While certain representative embodiments and details have been shown for the purpose of illustrating the invention, it will be apparent to those skilled in the art that various changes and modifications may be made therein without departing from the spirit or scope of the invention.

What is claimed is:

1. Tire building drum comprising shaping means having a pair of coaxially spaced first solid elastomeric end ring assemblies, an outer wall member and an inner wall member each said member having at each of its axial ends a solid elastomeric ring juxtaposed to the respectively associated end ring of the other member, the wall members defining therebetween a first annular inflatable envelope, which when uninflated forms a flat cylindrical building surface; two turnup means each having a second solid elastomeric end ring assembly, an outer annular bladder having a pair of solid elastomeric end rings and a first inner annular bladder having a solid elastomeric ring interfitted between the end rings of the outer bladder to form said end ring assembly; clamp means including a plurality of radially movable segments arranged in two coaxially spaced apart circumferential rows, a circumferential seat formed in each row of said segments, each seat retaining in juxtaposed relation one of said first end ring assemblies of said shaping means and the respectively associated second end ring assemblies of said turnup means; bead forming means comprising a pair of second annular bladders disposed between said inner and said outer wall members, each of said second bladders having a single solid elastomeric ring disposed between the respectively associated pair of end rings of the wall members and extending when uninflated axially toward the other thereof a distance less than one-half the distance between said ring assemblies, each said second bladder extending when uninflated axially inward from its associated ring assembly a distance at least approximately equal to the axial extent of the associated first bladder of the first-mentioned pair thereof.

2. Tire building apparatus comprising an axially continuous cylindrical building surface defined by an inflatable annular envelope having end rings, and a pair of annular inflatable turnup bladders having end rings arranged coaxially of and respectively abutting the end rings of said envelope, a plurality of segments arranged in two circumferential sets respectively disposed in axially spaced planes, each set of said segments providing a circumferential seat, each said seat accommodating said end rings of said envelope and the end rings of the respective turnup bladder in coterminous abutment at the respective said planes, said envelope having an inner wall and an outer wall each secured integrally and airtightly to the respective end rings of said envelope.

3. A tire building apparatus comprising:

carcass shaping means having a first pair of end ring assemblies and three annular inflatable chambers;

the first chamber thereof being defined by an outer wall and an inner wall each terminating axially in end rings located concentrically in the respectively associated one of said ring assemblies, both walls being of elastomeric material reinforced by cords extending axially between and into each respective end ring;

the second and the third chambers thereof being disposed coaxially between said outer and said inner wall and each being defined by a cord-reinforced annular wall having a solid elastomer ring concentrically integral therewith disposed concentrically between and in circumferential contact with the respectively associated end rings of said inner and said outer wall in said assemblies, said second and said third chamber each having an axial length when not inflated not greater than one-third of the uninflated axial length of said first chamber;

a pair of turnup means including a second pair of end ring assemblies disposed in coaxial abutting relation each respectively with the associated one of said first pair of end ring assemblies;

each turnup means including an inner and an outer annular inflatable chamber, said outer chamber, having a cord-reinforced elastomeric membrane having two circular end rings, said inner chamber being defined by an annular membrane having a solid elastomeric circular ring integrally thereon, the latter said ring being disposed concentrically in contact with and between the associated two end rings of the outer chamber membrane to form one of the second pair of end ring assemblies;

said inner chamber being disposed inside the outer chamber and at least approximately equal in uninflated axial length to the uninflated axial lengths of the second and the third chamber of said shaping means.

4. A tire building apparatus comprising carcass shaping means having means for modifying the inflated shape of said shaping means, with respect to its natural toric shape, to a toroid having an aspect ratio of less than 1.00, said shaping means having a radially outer wall comprising an outer layer and an inner layer coaxially joined to the outer layer, each said layer having reinforcing cords which extend from axial end to axial end of the respective layer, said means for modifying the shape comprising a plurality of elastically flexible blades equally spaced circumferentially of and extending longitudinally between said outer layer and said inner layer, each said blade occupying a congruent cavity formed between said inner and outer layer, each blade being rectangular in cross-section and graduated in thickness from its center axially outward to a lesser thickness at the respective ends thereof, each blade having an extension laterally outwardly from each of its respective ends, said extension lapping the associated end of the next adjacent blade, and at least one pair of holes opening radially through each blade, said inner and outer layer being integrally connected to each other through said at least one pair of holes.

5. A tire building drum comprising, a circumferentially continuous first annular envelope axially continuous between two bead-locating planes and a pair of second annular envelopes disposed coaxially of said first envelope and extending oppositely outward respectively from said planes, the first and the second said envelopes cooperating to provide the cylindrical building surface of said drum; a pair of carrier means mounted for equal and opposite movement coaxially of said drum and a plurality of rigid segments mounted on each said carrier means for symmetric movement radially of the drum axis, each segment having a surface underlying said first envelope and the respectively associated second envelope and extending axially in each direction from the respective bead-locating plane not more than one-third of the axial dimension of said first envelope, said first envelope comprising an inner and an outer wall member co-operating to define therebetween a first inflatable annular chamber, said inner and said outer member being circumferentially connected to one another adjacent each respective bead-locating plane, a first pair of independently inflatable anular bladders disposed within said first chamber and connected respectively to said inner and said outer wall member close to the respective bead-locating planes, and a second pair of annular inflatable bladders disposed respectively within said second envelopes and concentrically connected respectively to said second envelopes adjacent to said bead-locating plane, each first annular bladder being cooperable with the associated second annular bladder to apply a circumferentially continuous squeeze to compress the bead region of the tire therebetween.

6. Apparatus as claimed in claim 5, the outer wall of said first envelope comprising a pair of cord-reinforced plies the cords of which extend from one to the other of said bead-locating planes, blade means for modifying the shape of said outer wall, when the same is expanded by inflation, with respect to the shape of said outer membrane when inflated absent said blade means, said blade means comprising a multiplicity of blades of rectangular cross-section disposed between and secured to each of said plies and extending longitudinally parallel to the axis of the first envelope and spaced equally about said axis, each of said blades being graduated in thickness as measured radially of said envelope decreasing from a maximum thickness at its mid-length toward its ends, each blade having near each of its ends a lateral extension projecting in a circumferential direction sufficiently to overlap the next adjacent one of said blades.

7. Apparatus as claimed in claim 6, the outer membrane of said first envelope having a plurality of grooves sunk in its radially outward surface and extending axially inward from one of said bead-locating planes toward the other of said bead-locating planes.

8. Tire building apparatus comprising:
drum means providing a straight cylindrical building surface;
shaft means rotatably supporting the drum means for rotation;
center support means fixed coaxially and corotatably on said shaft means;
a pair of carrier means slidably and corotatably disposed on said shaft means for axial movement symmetrically toward and away from each other between a building position and a shaping position;
on each of said carrier means a plurality of clamping segments arranged to provide bead clamping rings in substantially continuous circular array mounted for symmetric movement radially of said shaft means, each of said segments extending axially from a respectively associated bead-locating plane a predetermined distance respectively toward and away from said center support means to provide two rigid cylindrical reaction surfaces;

each of said segments having a slot open radially outwardly thereof and in circumferential alignment to form a pair of axially spaced apart grooves extending circumferentially of the respective bead clamping rings;

bladder means defining said cylindrical band building surface and comprising:

a pair of dual turnup bladders disposed circumferentially of each of said bead clamping rings and extending axially outwardly from the bead engagement plane bisecting the respectively associated dovetail or T-groove;

each turnup bladder having a bead engagement ring disposed in the respectively associated dovetail or T-groove, an outer cord-reinforced membrane forming a first closed inflatable annular envelope attached to said bead engagement ring and extending in uninflated state axially outward therefrom;

an inner cord-reinforced membrane forming a second closed inflatable annular envelope inside said first envelope and attached to said bead engagement ring and extending axially in uninflated state outwardly therefrom about one-quarter of the axial extent of said outer membrane in its uninflated state;

and a shaping bladder disposed circumferentially of said clamp ring segments symmetrically of said center support means and extending axially in uninflated state from one to the other of said clamp rings, said shaping bladder having a pair of second bead seat rings disposed respectively in said dovetail or T-groove and respectively abutting the first bead seat rings of said turnup bladders;

an inner cord-reinforced wall and an outer cord-reinforced wall each attached to and extending in uninflated state between said two second bead seat rings, the walls forming a closed inflatable annular envelope, a pair of inside bladders each forming a closed inflatable annular envelope attached to a respectively associated one of said second bead seat rings and extending axially about one-fifth to one-third the distance between said second bead seat rings toward the other thereof inside said shaping bladder envelope formed by said walls;

said outer wall having an outer layer and an inner layer, and blade means disposed between and affixed to said inner and said outer layers for modifying the shape of said shaping bladder when inflated with respect to the inflated shape of said bladder absent such blade means;

said blade means comprising a plurality of long narrow blades extending parallel to said shaft and equally spaced thereabout, each blade having near each end thereof a side extension projecting in a circumferential direction sufficiently to overlap a next adjacent blade, and each blade being thicker, in depth radially of the drum, at its mid-length and graduated to lesser thickness radially of the drum progressively axially outward toward its end portions;

each of said clamp rings of segments being extendable radially of the drum means to engage at least one carcass ply between an endless inextensible bead core and one of each said first and said second bead seat ring in initial axially coplanar registry with said bead core;

said shaping bladder being inflatable to shape said carcass ply from its cylindrical form as laid about said building surface to said toroidally shaped carcass form, said clamp rings being concurrently movable axially toward said shaping position; said inside bladders and said second annular envelopes when inflated cooperating after shaping said ply with respectively associated ones of said reaction surfaces to turn ends of said ply about the respectively associated bead cores and radially outwardly along respective carcass sidewalls and to compress and to consolidate the ply with circumferentially uniform pressure in the regions of the sidewalls close to said bead cores while said sidewalls extend radially of said bead cores at or about the orientation thereof to be had in the tire after it has been cured, whereby relative rotational movement of the bead core and the adjacent carcass ply can be avoided.

9. Tire building drum comprising:

building surface means including center sleeve means, spring steel blade means disposed internally of said sleeve means and turnup bladder means abutting each axial end of said sleeve means cooperating to provide an axially extending cylindrical surface;

bead clamping means comprising a plurality of rigid segments arranged in two circumferential sets, each set of segments being formed to provide a circumferential ring accommodating seat, said center sleeve terminating in axially spaced solid elastomeric rings disposed respectively in said seats, each said turnup bladder means terminating in a solid elastomeric ring disposed in the respectively associated seat in abutting relation with the associated ring of said center sleeve means;

said blade means and said segments cooperating to rigidify said cylindrical surface.

10. A method of building and shaping a tire comprising providing flat cylindrical surface means including a center envelope terminating in spaced planes normal to an axis and turnup bladders respectively abutting and extending oppositely outward coaxially from said envelope;

forming a precarcass band in flat cylindrical form on said surface means;

positioning a pair of preformed inextensible bead cores in radially and coaxially spaced relation to lie respectively in said planes and about said band;

expanding said band first at circumferential locations respectively coplanar with the terminii of said envelope and with the bead cores to initiate conformation of the band about said bead cores;

expanding portions of said band then at locations immediately adjacent to and respectively inward and outward of each bead core to roll said portions simultaneously progressively radially outward of each bead core to enclose at least partially each bead core respectively between said portions while moving said bead cores axially toward each other sufficiently only to accommodate such expansions;

thereafter shaping said band with said envelope between said bead cores to a toroidal form having a shape ratio of radial height to axial width at least approximately that of the tire after the same has been cured by applying to said envelope radially outward pressure and by concurrently moving said bead cores toward each other to the spacing therebetween desired in the tire after curing the same;

and subsequently completing and curing the tire.

11. A method of building and shaping a tire comprising:

building a precarcass band on flat cylindrical surface means comprising a shaping envelope and a pair of turnup bladders coaxially abutting respectively the axial ends of the envelope;

disposing a pair of tire bead cores in coaxially spaced relation around said band and expanding first regions of said band respectively coplanar with said bead cores to conform said regions to said cores;

then conforming said band to said bead cores before shaping the remainder of said band by simultaneously inflating a pair of annular bladders respectively adjacent to the axially inward and the axially outward sides of each of said bead cores;

said bladders adjacent the axially inward sides of the respective bead cores being fixed inside of and respectively to the axial ends of the envelope, said bladders adjacent to the axially outward sides of said bead cores being inside of and fixed respectively to the axial ends of the turnup bladders which respectively abut the envelope so that the bead cores are at least partially wrapped by said band before the band is shaped toroidally;

then shaping said envelope to shape said band between said cores by pressurized air while moving said bead cores axially inward to the spacing therebetween desired in the tire after molding and curing the same;

and controlling the toroidal shape of said envelope when the same is expanded, to a shape ratio of radial height to axial width which is at least approximately equal to the shape ratio of said tire when the same has been molded and cured;

and subsequently completing and curing the tire.

12. A method of fabricating a tire comprising building a carcass in flat cylindrical form, positioning a pair of bead cores spaced coaxially and spaced radially outwardly of said band in two bead-locating planes, and expanding said band first at said planes to engage said band with said cores, then rolling the regions of the band adjacent the respective cores progressively radially outwardly simultaneously at each side of each core by inflating a pair of equally and oppositely disposed annular bladders closely adjacent each core and to each other beneath each core, and thereafter expanding to toroidal shape the carcass between said cores by inflating an annular envelope in said carcass to a predetermined shape ratio of radial height to axial width at least approximately equal to such ratio desired in the tire after the same has been cured, and by concurrently moving said cores and said regions axially to a spacing therebetween commensurate with such spacing in the tire after curing the tire.

* * * * *